US008117537B1

(12) United States Patent
Vell et al.

(10) Patent No.: US 8,117,537 B1
(45) Date of Patent: Feb. 14, 2012

(54) PLATFORM-INDEPENDENT METHOD FOR COMPUTER AIDED SCHEMATIC DRAWINGS

(75) Inventors: Jeffrey L. Vell, Slingerlands, NY (US); Darius M. Siganporia, Clifton Park, NY (US); Arthur J. Levy, Fort Lauderdale, FL (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 1004 days.

(21) Appl. No.: 11/670,461

(22) Filed: Feb. 2, 2007

(51) Int. Cl.
*G06F 17/00* (2006.01)
*G06F 17/20* (2006.01)
(52) U.S. Cl. .................. 715/236; 715/964; 715/237
(58) Field of Classification Search .................. 715/234, 715/237, 964, 236; 706/919
See application file for complete search history.

(56) References Cited

U.S. PATENT DOCUMENTS

| | | | |
|---|---|---|---|
| 6,223,094 B1 * | 4/2001 | Muehleck et al. ............ | 700/107 |
| 6,445,974 B1 * | 9/2002 | Malaugh et al. .............. | 700/182 |
| 6,647,305 B1 * | 11/2003 | Bigelow ........................ | 700/97 |
| 2002/0035450 A1 * | 3/2002 | Thackston ..................... | 703/1 |
| 2002/0130869 A1 * | 9/2002 | Camiener et al. ............ | 345/440 |
| 2008/0111816 A1 * | 5/2008 | Abraham et al. ............. | 345/420 |
| 2008/0281463 A1 * | 11/2008 | Suh et al. ...................... | 700/182 |
| 2008/0320151 A1 * | 12/2008 | McCanne et al. ............ | 709/228 |

OTHER PUBLICATIONS

Yang, Jeongsam, et al., "An XML-Based Macro Data Representation for a Parametric CAD Model Exchange", 2004., pp. 153-162.*
Mervyn, F. et al., "Developing distributed applications for integrated product and process design", Jul. 14, 2003, pp. 679-689.*
Li, W.D. et al., "Collaborative computer-aided design—research and development status", Jul. 1, 2004, pp. 931-940.*
Wrightson, Ann M., "XML and STEP", 1999, pp. 1-5.*
Barbosa, C.A.M., et al., "Distributed object model for collaborative CAD environments based on design history", Apr. 24, 2003, pp. 621-631.*
Mervyn F., et al. "Development of an Internet-enabled interactive fixture design system", 2003, pp. 1-16.*

* cited by examiner

*Primary Examiner* — Doug Hutton, Jr.
*Assistant Examiner* — James Debrow
(74) *Attorney, Agent, or Firm* — Michelle P. Nguyen; John T. Lucas

(57) ABSTRACT

A CAD/CAM method is disclosed for a computer system to capture and interchange schematic drawing and associated design information. The schematic drawing and design information are stored in an extensible, platform-independent format.

11 Claims, 9 Drawing Sheets

```
<!ELEMENT schematic (schematic-name, schematic-number, name,
classification,
    symbol-list-directory-path, drawing, display-view?, systems,
    drawing-background?, legend?)>
    <!-- schematic - The root element for a drawing.-->
<!ELEMENT schematic-name (#PCDATA)>
    <!-- schematic-name - The name of the Schematic that this drawing
applies to.-->
<!ELEMENT schematic-number (#PCDATA)>
    <!-- schematic-number - The number of the Schematic.-->
<!ELEMENT name (#PCDATA)>
    <!-- name - Name of the Schematic.-->
<!ELEMENT classification (#PCDATA)>
    <!-- classification - Security classification of the drawing.-->
<!ELEMENT symbol-list-directory-path (#PCDATA)>
    <!-- symbol-list-directory - Relative path of the symbol XML
files.-->
<!ELEMENT drawing (units, x-size, y-size)>
    <!-- drawing - Information about the original drawing size.
        This element contains child elements units, x-size and y-size.-
-->
<!ELEMENT units (#PCDATA)>
    <!-- units - The units for the drawing size.-->
<!ELEMENT x-size (#PCDATA)>
    <!-- x-size - The width of the drawing.-->
<!ELEMENT y-size (#PCDATA)>
    <!-- y-size - The height of the drawing.-->
<!ELEMENT display-view (units, x-size, y-size)>
    <!-- display-view - The viewable size of the drawing.
        This may be the same size as the drawing or smaller.   -->
<!ELEMENT systems (system*)>
    <!-- systems - The systems which are part of this drawing.
        These systems are defined in the system child elements.-->
<!ELEMENT system (system-name, system-abbr, system-color, components,
    pipes?, connectors?, instruments?)>
    <!-- system - A system that is on the drawing.-->
<!ELEMENT system-name (#PCDATA)>
    <!-- system-name - The full system name.-->
<!ELEMENT system-abbr (#PCDATA)>
    <!-- system-abbr - The system abbreviation.-->
<!ELEMENT system-color (#PCDATA)>
    <!-- system-color - The RGB color of the system on the drawing.
        This is contains the 8-bit RGB values enclosed in parentheses.
        (e.g. (0,64,128))-->
<!ELEMENT components (component*)>
    <!-- components - Container element for all of the components that
        are part of this system. This element contains zero or more
        component child elements. -->
```

FIG. 2A

```
<!ELEMENT component (comptype, compid, anchor?, rotation-matrix,
    anchor?, scale, sub-comp*, connect-to*, sub-comp*, designator?,
    normal-position?, designator?)>
    <!-- component - Container element which
        This element contains the the child elements comptype, compid,
        anchor?, rotation-matrix, anchor?, scale,
        The follow optional elements sub-comp*, connect-to*, sub-comp*
        The element contains zero or more of the following elements:
        designator?, normal-position?, designator?-->
<!ELEMENT comptype (#PCDATA)>
    <!-- comptype - The name of the XML file which contains the
        component drawing information. -->
<!ELEMENT compid (#PCDATA)>
    <!-- compid - The MIPTR number from CADD. This is a unique
        identifier for this component. -->
<!ELEMENT rotation-matrix (uvx-location, uvy-location, uvz-location)>
    <!-- rotation-matrix - The matrix which represents a rotation
        by an angle. This element contains the child elements
        uvx-location, uvy-location and uvz-location. -->
<!ELEMENT uvx-location (#PCDATA)>
    <!-- uvx-location - The X row of the rotation matrix.
        (e.g. cos(theta) sin(theta) 0 ). -->
<!ELEMENT uvy-location (#PCDATA)>
    <!-- uvy-location - The Y row of the rotation matrix.
        (e.g. -sin(theta) cos(theta) 0 ). -->
<!ELEMENT uvz-location (#PCDATA)>
    <!-- uvz-location - The Z row of the rotation matrix.
        (e.g. 0 0 1 ). -->
<!ELEMENT scale (#PCDATA)>
    <!-- scale - The scale of the drawing. -->
<!ELEMENT anchor (x-pos, y-pos)>
    <!-- anchor - The anchor point of the entity which
        contains child elements x-pos and y-pos.-->
<!ELEMENT x-pos (#PCDATA)>
    <!-- x-pos - The x coordinate of the parent element, in inches.-->
<!ELEMENT y-pos (#PCDATA)>
    <!-- y-pos - The y coordinate of the parent element, in inches.-->
<!ELEMENT connect-to (pipe, anchor-point)>
    <!-- connect-to - This element contains the child elements pipe and
        anchor-point. -->
<!ELEMENT pipe (#PCDATA)>
    <!-- pipe - The pipeid of the pipe connected to this element. -->
<!ELEMENT anchor-point (x-pos, y-pos)>
    <!-- anchor-point - The anchor point which connects the component
        to this pipe. This element contains the child elements
        x-pos and y-pos. -->
<!ELEMENT sub-comp (sub-fig, anchor, rotation-matrix)>
    <!-- sub-comp - This element contains the child elements
        sub-fig, anchor and rotation-matrix. -->
<!ELEMENT sub-fig (#PCDATA)>
    <!-- sub-fig - The name of the XML file which contains the sub-
component
        drawing information. -->
```

FIG. 2B

```
<!ELEMENT designator (text, anchor, text-rotation, text-just, text-
height)>
    <!-- designator - The text designator for this component. This
element
        contains the child elements text, anchor, text-rotation, text-
just
        and text-height. -->
<!ELEMENT text (#PCDATA)>
    <!-- text - The actual text of the designator. -->
<!ELEMENT text-rotation (#PCDATA)>
    <!-- text-rotation - The angle, in degrees, to rotate the text.-->
<!ELEMENT text-just (#PCDATA)>
    <!-- text-just - The justification of the text.
        Valid entries are: LJT, CJT, RJT.
            LJT - left justified text.
            CJT - centered justified text.
            RJT - right justified text.-->
<!ELEMENT text-height (#PCDATA)>
    <!-- text-height - The height of the text, in inches,
        on a full scale drawing.-->
<!ELEMENT normal-position (text, anchor, text-rotation, text-just,
text-height)>
    <!-- normal-position - -->
<!ELEMENT pipes (pipe-segment*)>
    <!-- pipes - Container element for all of the pipes that
        are part of this system. This element contains zero or more
        pipe-segment child elements. -->
<!ELEMENT pipe-segment (pipeid, pipe-color*, anchor-point*,
pipe-thickness, pipe-type?, pipe-dash?, pipe-blank?, break*)>
    <!-- pipe-segment - Contains the information about the
        pipe-segment. This element contains the child elements
        pipeid, pipe-thickness. Optionally it contains the elements
        pipe-color*, anchor-point*, pipe-type?, pipe-dash?, pipe-blank?
        and break* -->
<!ELEMENT pipeid (#PCDATA)>
    <!-- pipeid - The MIPTR number from CADD. This is a unique
        identifier for this pipe-segment. -->
<!ELEMENT pipe-color (#PCDATA)>
    <!-- pipe-color - The color of the pipe-segment -->
<!ELEMENT pipe-thickness (#PCDATA)>
    <!-- pipe-thickness - The thickness of the pipe-segment. Valid
entries are:
        1/4 to 1-1/2 In.
        2 to 3 In.
        4 In.
        14 In. -->
<!ELEMENT pipe-type (#PCDATA)>
    <!-- pipe-type - The type of the pipe. (e.g. solid, dashed) -->
<!ELEMENT pipe-dash (#PCDATA)>
    <!-- pipe-dash - The length of the dash in inches for this pipe-
segment. -->
<!ELEMENT pipe-blank (#PCDATA)>
    <!-- pipe-blank - The length of the blank area of a dashed line in
inches
        for this pipe-segment. -->
```

FIG. 2C

```
<!ELEMENT break (start, end)>
    <!-- break - Defines the location of breaks in the pipe drawing
segment
        for pipe crossings. This contains the child elements start and
end. -->
<!ELEMENT start (#PCDATA)>
    <!-- start - The start of a break in the pipe drawing segment. -->
<!ELEMENT end (#PCDATA)>
    <!-- end - The end of a break in the pipe drawing segment. -->
<!ELEMENT instruments (component*)>
<!ELEMENT connectors (connection*)>
<!ELEMENT connection (anchor, pipe*)>
<!ELEMENT drawing-background (figure*)>
    <!--background-drawing - Defines non-mousable components that
        are part of the background of the drawing (e.g. the Hull).
        This contains zero or more optional figure child elements.-->

<!ELEMENT legend (figure*)>
    <!-- legend - This is a container of figures. This contains
        zero or more child elements. -->
<!ELEMENT figure (figname, anchor)>
    <!-- figure - Defines the figure and the location of the figure in
        the drawing. This contains the child elements figname and
anchor. -->
<!ELEMENT figname (#PCDATA)>
    <!-- figname - The name of an XML file which is to be added to the
drawing. -->
```

FIG. 2D

```
<!ELEMENT component (comp-id, entity*)>
    <!-- component - The root element for a component.-->
<!ELEMENT comp-id (#PCDATA)>
    <!-- comp-id - identifier of the component-->
<!ELEMENT entity (entity-type, text?, anchor?, text-rotation?, text-
just?, text-height?,
    vertex*, fill-color?, line*, origin?, radius?, arc-start?, arc-end?,
pipe-thickness?)>
    <!-- entity - The entity to add to the drawing. Must have a child
element of "entity-type".
        The following are optional singular elements:
            text, anchor, text-rotation, test-just, text-height, fill-
color, origin, radius, arc-start, arc-end, pipe-thickness.
        There are two optional elements, vertex and line, which may
have multiple occurences.-->
<!ELEMENT entity-type (#PCDATA)>
    <!-- entity-type - Type of entity to draw-->
<!ELEMENT text (#PCDATA)>
    <!-- text - Text to be written in the component drawing-->
<!ELEMENT text-rotation (#PCDATA)>
    <!-- text-rotation - The angle, in degrees, to rotate the text.-->
<!ELEMENT text-just (#PCDATA)>
    <!-- text-just - The justification of the text.
        Valid entries are: LJT, CJT, RJT.
            LJT - left justified text.
            CJT - centered justified text.
            RJT - right justified text.-->
<!ELEMENT text-height (#PCDATA)>
    <!-- text-height - The height of the text, in inches,
        on a full scale drawing.-->
<!ELEMENT anchor (x-pos, y-pos)>
    <!-- anchor - The anchor point of the entity which
        contains child elements x-pos and y-pos.-->
<!ELEMENT x-pos (#PCDATA)>
    <!-- x-pos - The x coordinate of the parent element, in inches.-->
<!ELEMENT y-pos (#PCDATA)>
    <!-- y-pos - The y coordinate of the parent element, in inches.-->
<!ELEMENT vertex (x-pos, y-pos)>
    <!-- vertex - One of the verticies of a STRING entry-type which
        contains child elements x-pos and y-pos.-->
<!ELEMENT fill-color (#PCDATA)>
    <!-- fill-color - The RGB value of the color.-->
<!ELEMENT line (start, end)>
    <!-- line - The line segments that make up the FILL.
        It contains the child elements start and end.-->
<!ELEMENT start (x-pos, y-pos)>
    <!-- start - The starting coordinate of the line.
        It contains the child elements x-pos and y-pos.-->
```

FIG. 3A

```
<!ELEMENT end (x-pos, y-pos)>
    <!-- end - The ending coordinate of the line.
         It contains the child elements x-pos and y-pos.-->
<!ELEMENT origin (x-pos, y-pos)>
    <!-- origin - The origin of the arc.-->
<!ELEMENT radius (#PCDATA)>
    <!-- radius - The radius of the arc.-->
<!ELEMENT arc-start (#PCDATA)>
    <!-- arc-start - The starting position of the arc in radians.-->
<!ELEMENT arc-end (#PCDATA)>
    <!-- arc-end - The ending position of the arc in radians.-->
<!ELEMENT pipe-thickness (#PCDATA)>
    <!-- pipe-thickness - The thickness of the line to be drawn.-->
```

FIG. 3B

PLATFORM-INDEPENDENT METHOD FOR COMPUTER AIDED SCHEMATIC DRAWINGS

STATEMENT OF GOVERNMENT RIGHTS

The present invention was conceived and developed under U.S. Government Contract No. DE-AC12-00SN39357, awarded by the U.S. Department of Energy. The U.S. Government has rights in this invention.

BACKGROUND OF THE INVENTION

1. Field of the Invention

The invention relates to the field of computer aided drafting. More particularly, it relates to a method to capture and interchange schematic drawing and design information.

2. Discussion of the Related Art

Schematic drawings include mechanical, electrical, and fluid system drawings that have information related to the connection and interaction of components in the drawing. Current computer aided drafting methods provide either the data and engineering aspects of the components or the viewing and drawing aspects of the components, but not both. Computer Aided Design/Computer Aided Manufacturing (CAD/CAM) methods have been developed to combine the two, but these CAD/CAM methods have used proprietary or specialized tools or languages to format or access the data. For example, U.S. Pat. No. 6,223,094, for a Multi-Tiered Structure For Storing And Displaying Product And Process Variants, to P. Muehleck et al., uses a special language called EXPRESS.

There is a need in the art of Computer Aided Design/Computer Aided Manufacturing (CAD/CAM) for a method to provide a file that contains design information combined with schematic drawing information. The ability to provide both together is an important capability in schematic drawings which allows for interactive manipulation of schematic components.

The invention is a method to capture schematic drawing and associated design information by means of a digital computer. The method comprises the following steps:
 a) taking schematic drawing and design information from a drawing model and providing it to the computer;
 b) translating the schematic drawing and design information into a form amenable to drawing interchange;
 c) converting the translated schematic drawing and design information into a platform-independent format that is extensible; and producing a schematic platform-independent data file;
 d) validating that the schematic platform-independent data file meets the requirements of a format specification;
 e) parsing the schematic platform-independent data file to construct a generic data structure;
 f) validating the schematic platform-independent data file by validating the design information in the generic data structure;
 g) storing the validated schematic platform-independent data file in a computer-accessible medium; and
 h) retrieving the validated schematic platform-independent data fife for use in post processing analysis, modeling or reproduction.

The invention is a schematic drawing and design data interchange method. The method uses an available computer language rather than a specialized language. The method makes schematic drawing and design information available in a universally accessible form. The invention reduces schematic drawing development time and facilitates drawing distribution because of the use of a platform-independent schematic drawing markup language (SDML) file.

BRIEF DESCRIPTION OF THE DRAWINGS

FIG. 2 is a document type definition for schematic drawing markup language (SDML) system schematics.

FIG. 3 is a document type definition for schematic drawing markup language (SDML) components.

DETAILED DESCRIPTION OF THE INVENT

Figure 1:
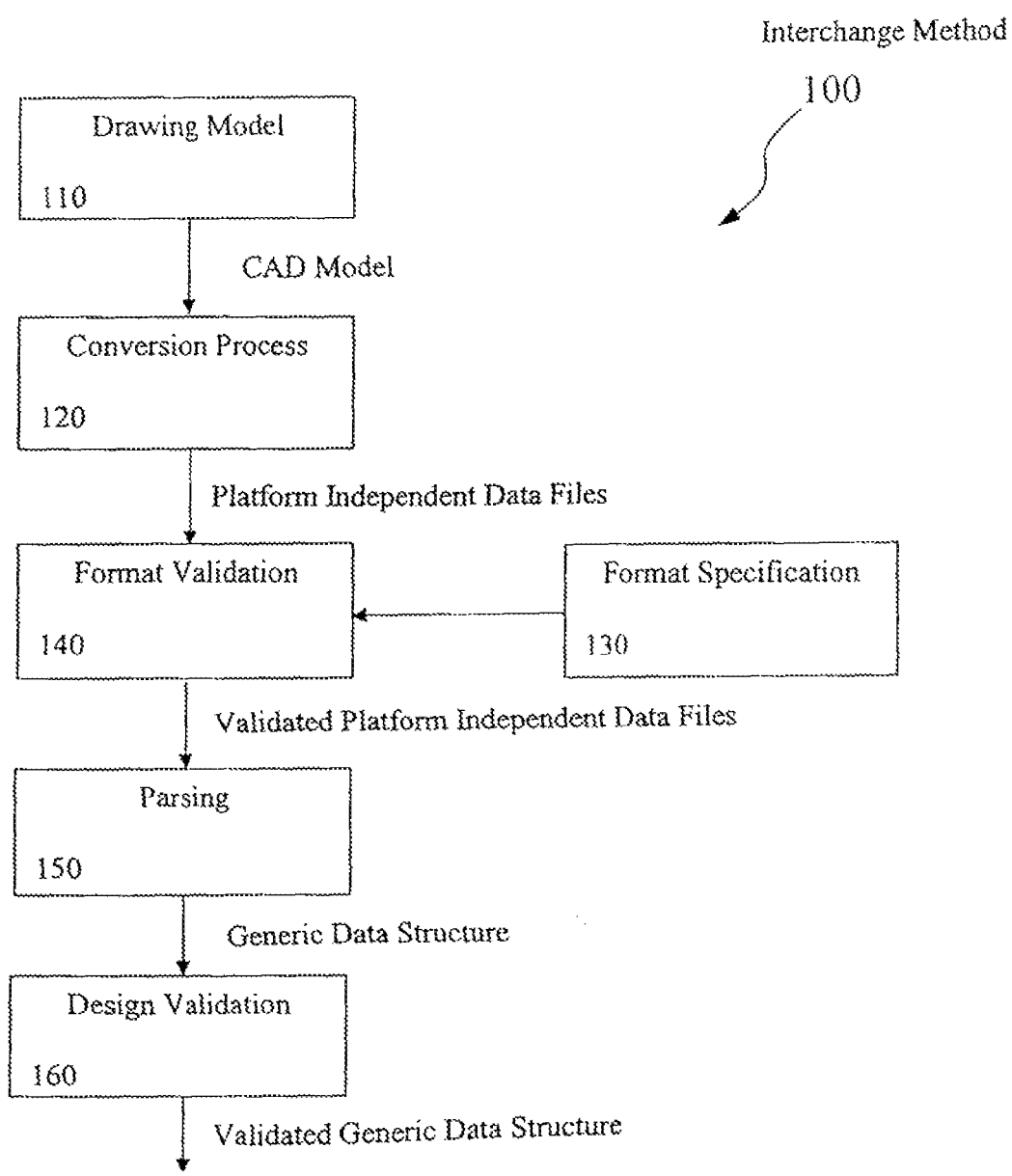
FIG. 1 is a diagram of the platform-independent, schematic drawing interchange method in accordance with the invention.

The invention is a schematic drawing interchange method for processing and rendering schematic system drawings. The method captures the pictorial image and functional information of system elements in a platform-independent format and produces one or more validated data files in a platform-independent format. Platform-independence provides for access to the schematic and design information using different, commonly available hardware and software. The method enables the capture and retention of design information including specification information that can be used for analysis, modeling and reproduction from different hardware and software platforms.

Design information refers to component relationships, systems organization, system element constraints, and system element properties.

Extensible refers to a property of a programming language or a system that allows for modification by changing or adding features to it.

Platform refers to the type of computer hardware or operating system. A hardware platform refers to the type of hardware in general. A general hardware platform is selected from the group including a main frame computer, work station computer, desk top computer, hand held computer and embedded computer. Hardware platform also may refer to the specific type of central processing unit (CPU). A specific central processing unit (CPU) is selected from the group consisting of x86, SPARC, PowerPC, and Alpha. An operating system is computer software that carriers out operating instructions. An operating system is selected from the group consisting of the versions of Microsoft® Windows®, the versions of Unix, Linux, Amiga and QNX.

The central processing unit (CPU) is also referred to as a processor or microchip. The CPU is the part of the computer that processes data and instructions. It typically contains the control unit which extracts instructions from memory and decodes and executes them, the arithmetic logic unit (ALU), and a small amount of memory.

The terms platform-independent, cross-platform and portable describe operating systems and application programs that can run on more than one platform. Some programming and scripting languages are also described as being platform-independent because they can be used to write programs for a wide range of hardware types and operating systems. Some platform-independent languages include C, Java, Perl, PHP and Python. In contrast. Visual Basic is not platform-independent, because it can only be used with Microsoft® Windows®.

Extensible markup language (XML) is a document and data interchange language from the World Wide Web Consortium. It is a meta-language standard used for creating special purpose markup languages. A dialect is a vocabulary or grammar subset of a language.

Schematic drawing markup language (SDML) is a special purpose markup language that is a subset of the extensible markup language (XML).

Document type Definition (DTD) is a declaration in an extensible markup language (XML) document that specifies constraints on the structure of the document, DTD's are usually employed to determine the structure of an XML document. A DTD will typically describe each allowable element within the document, the possible attributes and, optionally, the allowed attribute values for each element. It will also describe the nesting and occurrences of elements.

Scripting is the programming task of connecting diverse preexisting components to accomplish a new related task. Languages which are suited to scripting are often called scripting languages.

A scripting, or script, language may be a general purpose programming language or it may be limited to specific functions used to augment the running of an application or system program. Early scripting languages were known as batch languages or job control languages.

Format specification refers to the part of a format statement that specifies explicit data arrangement. It may be a list within parentheses that can include edit descriptors and field separators.

Reference is made to FIG. 1. Flow diagram 100 shows an interchange method in accordance with the invention. The major steps of the interchange method are as follows. The Conversion Process step 120 automatically converts Computer Aided Design (CAD) Drawing Model step 110 information to a platform-independent format such as a schematic drawing markup language (SDML), which is defined in Format Specification step 130 and produces a schematic and one or more component platform-independent data files. The Format Validation step 140 verifies that the platform-independent data files are properly formatted. Parsing step 150 processes the validated platform-independent data files to generate a generic data structure. A generic data structure is a data structure that is readable by commonly used hardware and software. Design Validation step 160 validates the accuracy and completeness of the schematic platform-independent data file by validating the design information in the generic data structure. That is, it ascertains that the schematic platform-independent data file is readable by commonly used hardware and software. The validated schematic platform-independent data file can be used for purposes such as post processing analysis, printing, displaying, storing in memory, and modeling. Some of the post processing analyses are flow analysis, engineering analysis, real time engineering analysis and real time tracking.

Drawing Model Step 110

The input to the drawing interchange process is a CAD model of a schematic diagram. This may be in any CAD software providing the CAD software has minimum capabilities:

1. Entities: Entities are data objects that contain a variety of drawing elements, such as attributes of a valve. Each entity must be included in a preexisting library of entities sometimes referred to as a component library. Some attributes may be deduced from the type of entity identified. The CAD software must have a way to identify entities.
2. Attributes: Each entity must have attributes that describe specific properties of the entity. Examples of attributes include position for graphical display, normal position, startup position, type of entity, labels and annotations.
3. Nodes: Nodes are the connection points of entities modeled in the CAD software. Every entity has a least one node if it is to be connected to another entity. For example, a simple pipe must have at least two nodes, one at each end. These nodes must have associated data that specifies what other entity is connected.
4. Containers: Entities may be contained within other entities or may have entities contained within them. Entities are generally grouped as being contained within a named system. For example, valves and pipes are grouped within a piping system. Drawing Model step 110 is an input step. Although input is in a specific CAD form, the input constitutes the sum of information required to be verified and generalized for interchange.

Conversion Process Step 120

Conversion Process step 120 takes the CAD drawing in Drawing Model step 110 and converts it in two steps to a platform-independent format. In the first step, each graphical entity in a container is extracted and converted to a platform-independent format. The graphical entities are written into component platform-independent files and stored in a components library. This is done for all the containers in the schematic. In the second step, all the entities and their associated nodes are converted to a platform-independent format. The converted nodes may be written into a schematic composite platform-independent file. The locations, rotations, and coordinates of all entities in the original drawing model are recorded. Components are recorded and grouped by system and placement. Piping is depicted by the color, line fonts and pipe size. Nodes and connect nodes are non-graphical features contained in a nodal figure that includes properties used in determining identifiers, component properties, connectivity and type of connectivity of components.

In a preferred embodiment, a design is generated using commercially available software. A Computer Vision® CADDS5® database and nodal figures are exported to extensible markup language (XML) through a ComputerVision® macro program and a script. A single script is developed for each CAD system to generate the schematic drawing markup language (SDML) files.

Format Specification Step 130

A Format Specification step 130 defines schematic and component platform-independent file formats for specifying the layout and connectivity of components contained in a schematic diagram. The use of consistent, platform-independent formats facilitate configuration control, especially when multiple CAD systems are used.

Schematic drawing markup language (SDML) is useful for defining platform-independent schematic drawing information. Extensible markup language (XML) vocabularies referred to as dialects may be defined using a document type definition (DTD). Schematic drawing markup language (SDML) is defined using two related document type definitions (DTD's). The first definition is the schematic drawing markup language (SDML) system schematic document type definition (DTD) shown in FIG. 2 A, B, C, D. The second definition is the schematic drawing markup language (SDML) component document type definition (DTD) shown in FIG. 3 A, B. The use of extensible markup language (XML) and schematic drawing markup language (SDML) has several advantages because this commercially available software is efficient and straightforward. These languages are expandable without introducing risk of error to an existing structure. These languages are useful in either graphics rendering or engineering analysis applications.

Format Validation Step 140

Format Validation step 140 is the first of two steps to validate that the schematic independent data file is accurate and complete. In the Format Validation step 140 each component platform-independent data file and the schematic platform-independent data file are compared to the appropriate format specification defined in step 130 to assure that the format is correct. There is assurance at the output of this step that the schematic independent data file complies with the schematic drawing interchange method and is capable of being transferred to and interpreted by different platforms. Although it is crucial that each file is validated for proper format at its origin, any file may also be validated at any time in its life cycle.

Parsing Step 150

Parsing step 150 takes the validated platform-independent files and creates a generic data structure that stores the platform-independent data in a logically organized and easily retrievable form. In the preferred embodiment, parsing step 150 uses an automated validating extensible markup language (XML) parser on schematic drawing markup language (SDML) data to create the generic data structure. One of the benefits of using schematic drawing markup language (SDML) is that since it is an extensible markup language (XML) based language it is easier to retrieve named information. Parsing of a schematic drawing markup language (SDML) file is made easier by the presence of an automated parser for extensible markup language (XML) files.

Design Validation Step 160

Design validation step 160 is the second step to verify the accuracy and completeness of the schematic platform-independent, data file. The design validation step 160 validates the schematic platform-independent data file by validating the design information in the generic data structure. It should be noted that the information drawn upon exists in the original CAD model, but in this step it is validated in the generalized form. In most cases, it is not possible to perform this validation step in the original form of the data since this capability does not, exist in most CAD software. The steps performed in the invention may be done in any general programming environment.

Figure 4:
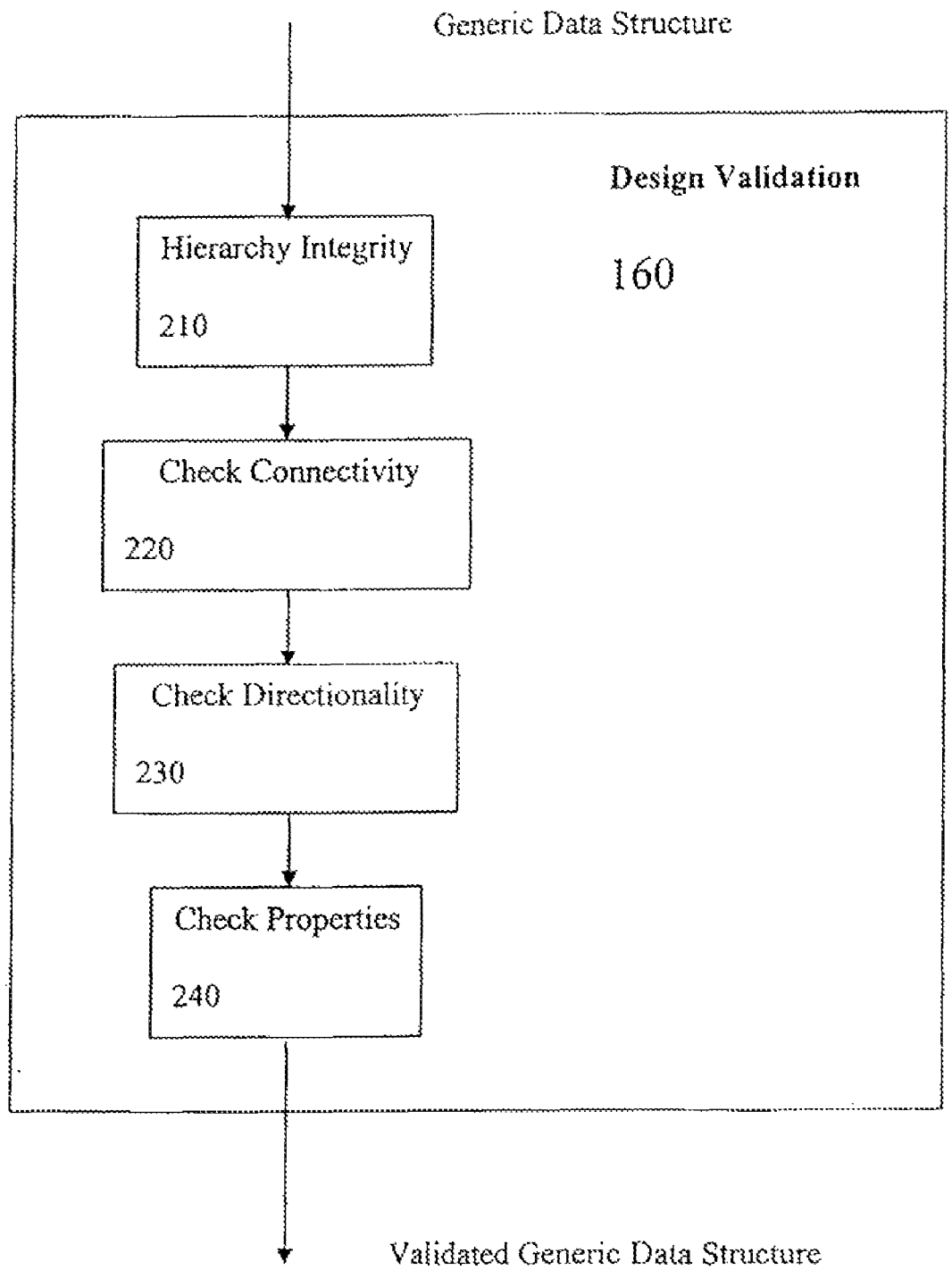
FIG. 4 is a diagram revealing the elements of design validation in accordance with the invention.

Details of the Design Validation step 160 are shown in FIG. 4. The Design Validation step 160 includes the subsidiary steps of Hierarchy Integrity step 210, Check Connectivity step 220, Check Directionality step 230, and Check Properties step 240. If any of these subsidiary steps is not needed for a specific application, then the unnecessary step function may be omitted. Subsidiary steps are described below.

Hierarchy Integrity Step 210

Hierarchy Integrity step 210 automatically checks that entities recognized as containers have the correct constituent parts. These constituent parts may also be containers themselves providing for a cascade of container entities. For example, in a mechanical implementation, valve operators are contained within valve assemblies, which in turn are contained, within systems, which in turn are contained within plants.

Check Connectivity Step 220

The Check Connectivity step 220 is made as part of the processing that verifies logical connectivity. This step is analogous to evaluating the integrity of how jigsaw puzzle pieces fit together to form a complete picture. In this step the individual entities are logically connected to validate the big picture of the ensemble of entities. The logic used relies on physical constraints. In a piping example, a pipe must connect to two other entities which may be a component or a fitting, but not another pipe. Connectivity that is incomplete, duplicated or conflicting is identified as a potential error. This would indicate a flaw in either the original CAD schematic drawing or in the Conversion Process step 120. Identifying a flaw in this manner has not been accomplished in the prior art.

Check Directionality Step 230

Check Directionality step 230 is required because certain entities have flow direction associated with them. For example, fluid running through pumps and check valves has a flow direction. Also, electronic circuitry has a flow direction for electricity. A check is made to verify that such flow direction agrees with the nature of each entity. In the piping example, both pumps and check valves have a specific output node indicating flow direction. Detecting a pump blocked by a check valve is an indication of a possible flow error. An error may originate in the CAD system or the basic design.

Check Properties Step 240

Check Properties step 240 verifies that attributes of the schematic drawing markup language (SDML) file agree with known physical properties of each entity. For instance, pipes have two endpoints and n-way valves have n+1 endpoints. In other embodiments, properties obtained from external sources are used to make further judgements about the validity of the schematic drawing. For example, a check may be made to verify that 6-inch pipes connect to 6-inch flanges. In an electrical example, a check may be made to verify that a high-voltage source does not connect to a low-voltage component.

Example Environment for Interchange Method

Figure 5:
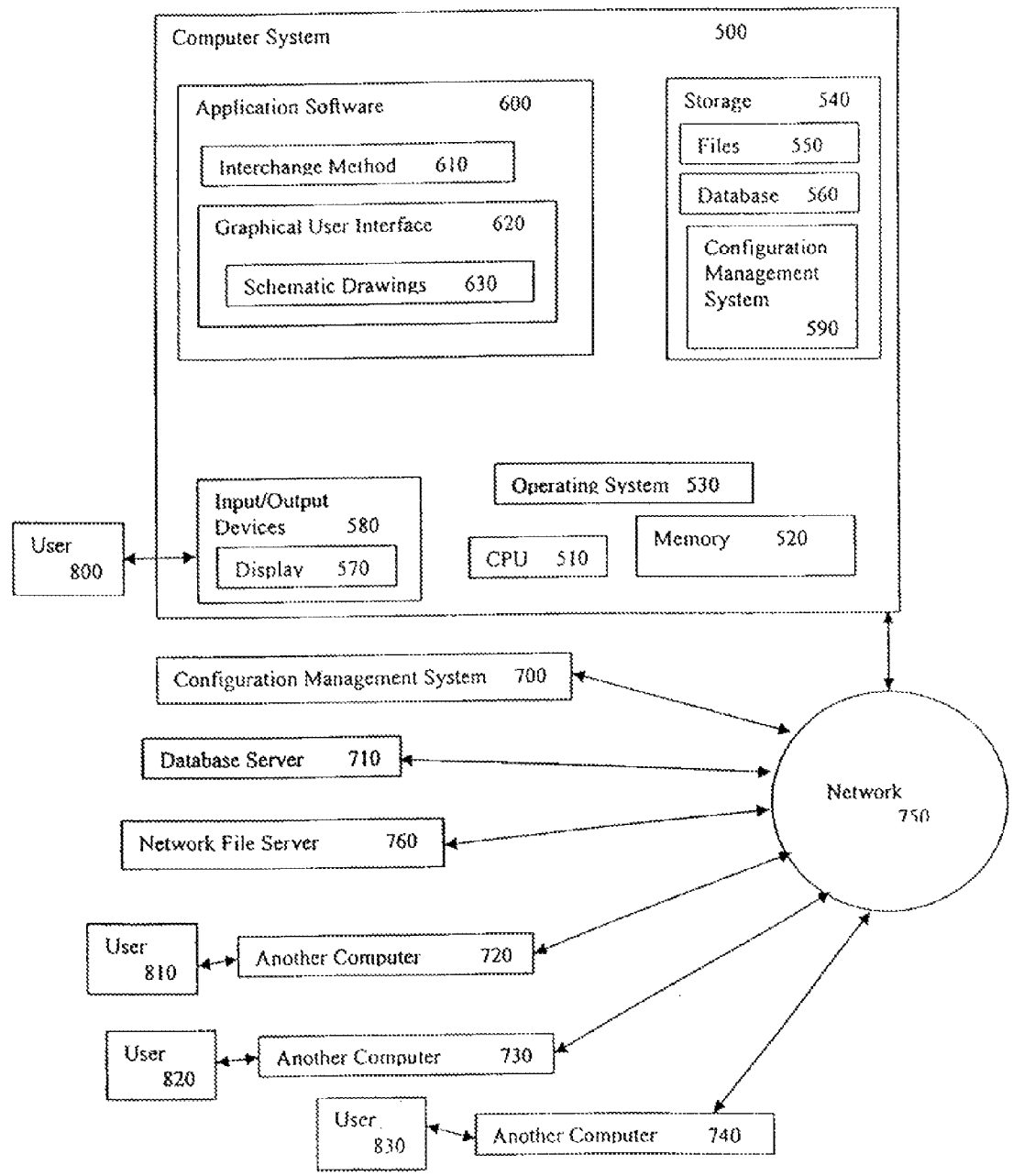
FIG. 5 illustrates a system using the interchange method.

FIG. 5 is an example of a computer environment in which the method of the invention is used. A user 800 creates a schematic drawing and design information by means of computer 500 through input/output devices 580. User 800 may also use a computer 500 to access, edit, or modify schematic drawing and design information that has already been created. The computer 500 is a standard general purpose computer with a Central Processing unit (CPU) 510, memory 520, operating system 530, display 570, and input/output devices 580. Computer 500 has storage 540 which will usually contain local copies of files 550, a database 560, and/or a configuration management system 590.

A digital computer may be connected to a network 750 through which the user may access data on a database server 710, a configuration management system 700, or a network file server 760. Computer 500 also contains application software 600 that the user 800 employs to observe or modify schematic drawing and design information via a graphical user interface 620 which may show schematic drawings 630 on a display device 570. A portion of the application software 600 is the interchange method 610. The user 800 employs the interchange method 610 to validate and interact with schematic drawing and design information stored locally on the computer 500, on the network file server 760, on the database server 710 or in the configuration management system 700. Other users 810, 820, 830 may use other computers 720, 730, 740 to access the schematic drawing and design information in the same manner as the first user 800.

Configuration Management

Configuration management is a process in which changes to a system, design, or other events are kept track of over time. During system design a number of users make changes over time. A platform-independent format eliminates the need for maintaining older computer systems and software in order to access old designs. When an extensible markup language (XML) framework is used, the document type definitions (DTD) themselves are documents subject to revision control because the language may be extended at anytime. Note that extending an extensible markup language (XML) does not render older software applications and associated files inoperable, but merely adds data which the application will ignore. Using configuration management tools to track the combination of drawing and design data held in platform-independent files as well as the format specifications for those files is also new.

The invention is a platform-independent thawing and design data interchange method that uses a schematic drawing markup language (SDML) rather than a specially devised language such as EXPRESS. The advantage of using extensible markup language (XML) is that it is a standard language, widely used and incorporated into many commonly used computer operating systems such as Microsoft (MS) Internet Explorer® and Microsoft XP Office®. Extensible markup language (XML) parsers are standard features of the Java® programming language and MS Visual Basic®. Compatibility with a standard parser makes it possible for software developers to incorporate the platform-independent drawing and design data interchange method into new applications. Use of extensible markup language (XML) in an application instead of a specialized language aids in reducing the dependence on software development tools and simplifies configuration control.

The foregoing discussion discloses and describes the embodiments of the invention by way of example. One skilled in the art will readily recognize from the discussion and from the accompanying drawings and claims, that various changes, modifications and variations can be made therein without departing from the spirit and scope of the invention as provided in the following claims.

What is claimed is:

1. A method to capture and interchange schematic drawing and associated design information, comprising the steps of:
providing a computer with a schematic data file containing schematic drawing and design information in an extensible platform-independent format from a database;
validating that the schematic platform-independent data file meets the requirements of a format specification;
parsing the schematic platform-independent data file to construct a generic data structure;
validating the schematic platform-independent data file by validating the design information in the generic data structure;
storing the validated schematic platform-independent data file in a computer-accessible medium; and
retrieving the validated schematic platform-independent data file for use in post processing analysis, modeling or reproduction;
wherein the format specification is expressed as a schematic drawing markup language (SDML).

2. The method of claim 1 wherein the format specification is expressed as an extensible markup language (XML) document type definition (DTD).

3. A system for capturing schematic drawing and design information comprising:
a computer;
software for creating, or obtaining a data file containing schematic drawing and design information;
software for converting the schematic data file into a platform-independent format that is extensible; and producing a schematic platform-independent data file; or leaving the schematic data file unchanged if it is in the desired platform-independent format;
a format for the extensible platform-independent specification;
software to validate that the schematic platform-independent data file meets the format specification;
a parser that can convert the schematic platform-independent data file into a generic data structure;
software that validates the schematic platform-independent data file by validating the design information in the generic data structure; and
a storage system for retaining the schematic platform-independent file;
wherein the format specification is expressed as a schematic drawing markup language (SDML).

4. The system of claim 3 wherein the computer is connected to a computer network.

5. The system of claim 3 wherein the schematic drawing and design information is accessed and maintained in a database.

6. The system of claim 3 wherein the schematic drawing and design information is accessed and maintained in a configuration management system.

7. The system of claim 3 wherein the schematic drawing and design information is accessed and maintained on a network file server.

8. The system of claim 3 wherein multiple users on network connected computers have access to the schematic drawing and design information.

9. A method executed in a computer system to capture schematic drawing and associated design information, comprising the steps of:
providing a schematic drawing and design information from a drawing model to the computer;
translating the schematic drawing and design information into a form amenable to drawing interchange;
converting the translated schematic drawing and design information into a platform-independent format that is extensible; and producing a schematic platform-independent data file;
validating that the schematic platform-independent data file meets the requirements of a format specification;
parsing the schematic platform-independent data file to construct a generic data structure;
validating the schematic platform-independent data file by validating the design information in the generic data structure;
storing the validated schematic platform-independent data file in a computer-accessible medium; and
retrieving the validated schematic platform-independent data file for use in post processing analysis, modeling or reproduction;
wherein the format specification is expressed as a schematic drawing markup language (SDML).

10. The method of claim 9 wherein the format specification is expressed as an extensible markup language (XML) document type definition (DTD).

11. The method of claim 9 wherein the computer-accessible medium is a file.

* * * * *